United States Patent [19]

Ueda et al.

[11] Patent Number: 4,832,987
[45] Date of Patent: May 23, 1989

[54] PROCESS OF PRODUCING MODIFIED WOOD

[75] Inventors: Minoru Ueda; Hideaki Matsuda; Koichi Murakami, all of Kagawa, Japan

[73] Assignee: Okura Kogyo Kabushiki Kaisha, Japan

[21] Appl. No.: 76,358

[22] Filed: Jul. 22, 1987

[30] Foreign Application Priority Data

Dec. 11, 1986 [JP] Japan ............................ 61-293451

[51] Int. Cl.$^4$ .............................................. B06D 3/00
[52] U.S. Cl. .................................. 427/297; 427/325; 427/350; 427/386; 427/397; 427/440
[58] Field of Search .............. 427/297, 350, 386, 397, 427/325, 440

[56] References Cited

U.S. PATENT DOCUMENTS

| | | | |
|---|---|---|---|
| 2,867,543 | 1/1959 | Braun | 427/297 |
| 4,025,663 | 5/1977 | Brandt | 427/297 |
| 4,057,658 | 11/1977 | Sjöö et al. | 427/385.5 |
| 4,060,953 | 12/1977 | Milne | 427/297 |

OTHER PUBLICATIONS

*The Condensed Chemical Dictionary*, 6th ed. Rheinhold, N.Y., 1961, pp. 444 and 445.

*Primary Examiner*—Janyce Bell

[57] ABSTRACT

A process of producing modified wood by impregnating dried wood with a mixed solution composed of phthalic anhydride as a polybasic acid anhydride and epichlorohydrin as an epoxy compound at a mol ratio of 1:1 to 1:30 by dipping the wood in the mixed solution, withdrawing the impregnated wood from the mixed solution, and heating the wood to a temperature of from 60° C. to 180° C. to simultaneously adding phthalic anhydride and epichlorohydrin to the hydroxyl groups of the wood. By the process of this invention, excellent dimensional stability and weather resistance can be imparted to the wood while retaining the properties specific to the wood.

18 Claims, No Drawings

PROCESS OF PRODUCING MODIFIED WOOD

FIELD OF THE INVENTION

This invention relates to a process of modifying the surface layer portion of wood. More particularly, the invention relates to a process of very advantageously producing modified wood having excellent dimensional stability and weather resistance.

BACKGROUND OF THE INVENTION

Since wood is light, strong, and can be easily processed or shaped, wood has been used from old for building materials, furniture materials, and other wide uses but has a disadvantage that wood is liable to cause dimensional deformation by the increase or decrease of bound water in the wood. Also, wood which is used for outdoor materials such as outdoor wall materials, ceiling materials under the eaves, sliding shutters, etc., is liable to be deteriorated by ultraviolet rays in sun beam, moisture, oxygen, etc., and thus has a problem in weather resistance.

For improving the dimensional stability and the weather resistance of the aforesaid wood, the inventors previously proposed a process of modifying wood by dipping wood in a mixed solution composed of a polybasic acid anhydride and an epoxy compound to cause reaction under heating, whereby the wood is chemically modified by adding the polybasic acid anhydride to the hydroxyl groups of the wood component by a ring-open esterification reaction to form carboxyl group and at the same time by adding the epoxy compound existing in the mixed solution to the carboxyl groups formed at the side chains.

The modified wood obtained by the above-described process is excellent in dimensional stability, weather resistance, etc., but in the case of producing such woods in an industrial scale, there are following problems. That is, since a mixed solution composed of a polybasic acid anhydride and an epoxy compound is used at high temperature in the aforesaid process, the stability of the solution in the long run is poor and hence it is difficult to use the solution continuously for a long period of time. Also, there is a disadvantage that wood components are partly dissolved in the mixed solution in a high-temperature reaction to cause discoloring of the wood. Furthermore, there is a disadvantage that a large heat energy and a long time are required for raising the temperature of the mixed solution.

Also, a problem to be solved in the aforesaid production process of modified wood is that in the case of washing the wood which was finally treated in the mixed solution under heating, the treated wood contains the unreacted mixed solution in an amount of from about 50% by weight to 200% by weight of the wood and hence it is a loss in industrial view point to remove the mixed solution by washing. Furthermore, in this case, there is also a disadvantage that a large amount of organic solvent is used for washing the treated wood, which is undesirable in the points of safeness and working environmental sanitation.

SUMMARY OF THE INVENTION

The object of this invention is, therefore, to provide a process of very advantageously producing in industrial scale modified wood excellent in, particularly, dimensional stability and weather resistance.

As the result of various investigations on attaining a process of industrially advantageously obtaining modified wood having excellent performance without being accompanied by the above-described disadvantages, the inventors have discovered that modified wood excellent in dimensional stability and weathering resistance is industrially advantageously obtained by impregnating the wood with a mixed solution composed of a polybasic acid anhydride and an epoxy compound, then separating the excessive mixed solution remaining without being permeated in the wood at the impregnation step from the wood impregnated with the mixed solution, and thereafter heating the wood impregnated with the mixed solution to a temperature of from 60° C. to 180° C., whereby the polybasic acid anhydride and the epoxy compound are simultaneously added to the hydroxyl groups of the wood components existing at least in the surface layer portion of the wood.

It has also been discovered that modified wood having more excellent effect in, particularly, dimensional stability is obtained with good economical efficiency by heating the above-described treated wood impregnated with the mixed solution and subjecting the treated wood to a suction treatment under reduced pressure during the chemical modification or after the chemical modification, whereby the unreacted components are evaporated and recovered and at the same time an oligomer of the polybasic acid anhydride and the epoxy compound formed as a side-reaction product during the aforesaid heating is allowed to exist in the treated wood.

In other words, the feature of this invention is in the point that the excessive mixed solution of the polybasic acid anhydride and the epoxy compound, which is not permeated in the treated wood in the case of impregnating the wood with the mixed solvent prior to applying the chemical modification, is removed from the treated wood, which results in making the mixed solution stable for a long period of time and capable of continuously using or repeatedly using the mixed solution. Also, the object of this invention is to provide a process of producing modified wood suitable for industrial production capable of effectively recovering the unreacted mixed solution in the treated wood without using organic solvent as in our previous process described above.

DETAILED DESCRIPTION OF THE INVENTION

The wood which is used in this invention retains the texture structure of wood. The wood may be having any desired form such as a column form, a board form, a block form, etc., and also there is also no particular restriction on the kind of wood.

Practical examples of the polybasic acid anhydride for use in this invention are phthalic anhydride, maleic anhydride, succinic anhydride, tetrahydrophthalic anhydride, hexahydrophthalic anhydride, itaconic anhydride, chlorendic anhydride, trimellitic anhydride, pyromellitic anhydride, etc. In particular, phthalic anhydride, maleic anhydride, succinic anhydride, etc., which are industrially advantageous and low in cost, are preferred in this invention. In these materials, phthalic anhydride is most preferred owing to the large modifying effect for wood.

There is no specific restriction on the epoxy compounds for use in this invention and examples thereof a epichlorohydrin, methyl glycidyl ether, ethyl glycidyl ether, allyl glycidyl ether, glycidyl methacrylate, phenyl glycidyl ether, styrene oxide, olefin oxide, butyl glycidyl ether, cresyl glycidyl ether, diglycidyl ether of bisphenol A, glycerol glycidyl ether, etc. In particular, epichlorohydrin, methyl glycidyl ether, ethyl glycidyl ether, allyl glycidyl ether, glycidyl methacrylate, styrene oxide, etc., which can be easily industrially produced in mass production, have relatively small molecular weight, and have low boiling point, are preferred and further epichlorohydrin is particularly preferred owing to the large modification effect for wood.

Then, the production process of this invention is explained in succession.

First, it is preferred for facilitating the chemical modification and in the relation with chemicals used that the columnar, board-form, or block-form wood is dried by means of a hot blast dryer, etc., to reduce the moisture content in the wood below about 10% before use.

On the other hand, as a reaction solution for modifying the wood, a mixed solution of the polybasic acid anhydride and the epoxy compound as illustrated above is used. It is preferred that the mol ratio of the polybasic acid anhydride to the epoxy compound in the mixed solution is from 1:1 to 1:30. The polybasic acid anhydride is used in excess of the epoxy compound in this invention as described above since the epoxy compound has an effect of acting as a solvent for the polybasic acid anhydride and further the use of a large amount of the epoxy compound has an effect of increasing the extent of the addition of the epoxy compound to the carboxyl groups at the side chains of the esterified wood obtained in the intermediate stage of the chemical treatment to reduce the acid value of the modified wood.

Also, the mixed solution for use in this invention can be generally prepared without using solvent but according to the kind of the polybasic acid anhydride, there is sometimes a case that the polybasic acid anhydride is not dissolved in the epoxy compound, and in such a case, it is preferred to prepare the mixed solution using a solvent such as dimethylformamide, dimethyl sulfoxide, etc. Furthermore, the ring-opening esterification reaction of the polybasic acid anhydride and the hydroxyl groups of the wood components existing in the surface layer portion of the wood and the addition esterification reaction of the epoxy compound and the side chain carboxyl groups formed by the aforesaid ring-opening esterification reaction sufficiently proceed in the absence of catalyst but for accelerating the reactions, it is preferred to use an acid catalyst such as sulfuric acid, perchloric acid, p-toluenesulfonic acid, etc., or a basic catalyst such as sodium carbonate, dimethylbenzylamine, pyridine, etc.

For impregnating wood with the mixed solution thus prepared, the wood may be dipped in the mixed solution or the mixed solution may be coated on or injected in the wood. Also, by performing the aforesaid impregnation process of the mixed solution under reduced pressure, increased pressure, or under alternate application of reduced pressure and increased pressure, the impregnation of the mixed solution can be further accelerated.

Then, the wood impregnated with the mixed solution obtained by the aforesaid process is separated from the excessive mixed solution which is remaining unimpregnated and thereafter, the wood impregnated with the mixed solution is heated in a reaction vessel. In this case, the system is required to be heated to from 60° C. to 180° C. This is because, if the temperature is lower than 60° C., the above-described reaction scarcely proceeds and if the temperature is higher than 180° C., defects such as the discoloration and the deterioration of the wood occur.

The heating time depends upon the kinds of the polybasic acid anhydride and the epoxy compound, the reaction temperature, etc., but is generally from 0.5 to 8 hours, preferably from 1 to 3 hours. After the heat treatment, by removing the unreacted mixed solution in the treated wood by, for example, washing with a solvent and drying, the modified wood of this invention can be obtained.

On the other hand, the aforesaid unreacted mixed solution is contained in the treated wood in an amount of from about 50% by weight to 200% by weight to the weight of the wood and it is an industrial loss to remove the mixed solution by washing and hence it is desirable to recover the unreacted mixed solution by a suction process as described below.

That is, while chemically modifying the wood impregnated with the mixed solution by heating or after chemically modifying the treated wood, the pressure in the reaction vessel is reduced to higher degrees of a reduced pressure than 50 mm Hg to reduce the boiling point of the unreacted mixed solution in the treated wood and evaporate the unreacted mixed solution, and the evaporated mixed solution is cooled and liquefied outside the reaction vessel for recovering the unreacted mixed solution. The modified wood withdrawn from the reaction vessel after performing the suction under reduced pressure for a definite period of time is a product as it is and hence the application of additional washing and drying is unnecessary.

The modified wood thus obtained has a low acid value. This shows that since the mol concentration of the epoxy compound existing in the mixed solution is higher than that of the polybasic acid anhydride in the mixed solution, the greater part of the side chain carboxyl groups of the esterified wood an addition esterification reaction with the epoxy group in the epoxy compound. Also, in the infrared absorption spectra of the modified wood, the characteristic absorption band of the addition product of the polybasic acid anhydride and the epoxy compound are clearly viewed. Thus, aforesaid matters show that a ring-opening esterification reaction and an addition esterification reaction occur in the process of this invention.

The purpose of adding the epoxy compound to the carboxyl group of the esterified wood as described above is to add the epoxy compound residue having high hydrophobic property to the hydrophilic carboxyl group for reducing the hydrophilic property thereof.

Since as described above, according to the production process of this invention, after sufficiently impregnating wood with the aforesaid mixed solution, the excessive mixed solution remaining without being impregnated is separated from the wood prior to the application of the chemical modification to the wood, the mixed solution has not been subjected to heat treatment and hence can be reused or recycled. Also, in the process of this invention, the chemical modification by heating of the wood impregnated with the mixed solution can be performed with less heat energy than that in the above-described conventional heating-in-solution process, which makes the process of this invention industrially very advantageous. Furthermore, in the process of this invention, the unreacted mixed solution remaining in the treated wood can be recovered without being wasted in the case of recovering it by suction under reduced pressure, washing by solvent and drying of the wood thereafter are unnecessary, and hence the process is economical and can be performed with high efficiency.

On the other hand, the modified wood obtained by the process of this invention is particularly excellent in dimensional stability, shows less hygroscopicity and swelling ratio than those of the untreated wood, the antishrink efficiency (ASE) thereof is as high as from 60% to 75%, and the product of this invention has an excellent dimensional stability for a long period of time.

The reason that the modified wood shows an excellent dimensional stability is by a blocking effect, that is, the effect of reducing the number of hydroxyl groups by blocking the hydroxyl groups in the wood having moisture absorptive faculty by the esterification thereof and a bulking effect, that is the effect that there is a limitation on swelling of wood based on the construction of the cell walls thereof and the space for adsorbed water is reduced by the entrance of the bulky substituents of the polybasic acid anhydride and the epoxy compound in the portions of the wood capable of containing water.

Also, the modified wood obtained by a suction in reduced pressure process is, astonishingly, very excellent in dimensional stability as compared with a modified wood obtained by washing the treated wood with solvent after heat treatment described above. This is because the free oligomer of the polybasic acid anhydride and the epoxy compound formed as a side-reaction product during heating the treated wood exists in the wood obtained by suction in reduced pressure and the bulking effect of the free oligomer further contributes to the increase of the dimensional stability. On the other hand, in a modified wood obtained by a washing process, the free oligomer described above is dissolved off with a solvent and hence the bulking effect by the oligomer cannot be obtained. Also, since the aforesaid free oligomer is generally water-insoluble, the reduction of the dimensional stability of the modified wood obtained by suction in reduced pressure with the passage of time is less under ordinary using conditions for the wood.

On the other hand, the modified wood obtained by the process of this invention shows very less discoloring and deterioration thereof as compared to the untreated wood and hence is also excellent in weather resistance.

In the modified wood obtained by the process of this invention, the occurrence of dimensional change or deformation of the wood by the action of moisture, which is a fault of wood, can be restricted and also the occurrence of the deterioration thereof by the actions of ultraviolet rays in sun beam, moisture, oxygen, etc., can be restricted without losing the excellent features specific to the wood. Furthermore, as a secondary effect in this invention, the occurrences of the decay and damages by various wood decaying bacteria and termites can be also restricted.

As described above, the modified wood having excellent characteristics obtained by the process of this invention can be suitably used for various fields such as building materials, furniture materials, etc., and can be used as the materials for, for example, pillars, crossbeams, foundation materials, floor materials, ceilling materials under eaves, sliding shutters, outdoor walls, desks or tables, bookshelves, etc.

Then, the following examples and comparison examples are intended to practically illustrate the present invention but not to limit it in any way.

EXAMPLE 1

An absolutely dried wood of a Japanese cypress (hereinafter, is referred to as dried wood) having a length of 3 cm in tangential direction, a length of 3 cm in radial direction, and a length of 5 mm in longitudinal direction was dipped in a mixed solution composed of 14.8 g of phthalic anhydride and 166.4 g of epichlorohydrin (1:18 in the mol ratio of phthalic anhydride to epichlorohydrin) and the mixed solution was injected into the wood for 30 minutes under reduced pressure, whereby the wood was impregnated with the mixed solution. The wood thus subjected to the impregnation treatment was withdrawn from the mixed solution and then heated in a reaction vessel for 3 hours at an inside temperature of 110° C. After heating, the wood was withdrawn from the reaction vessel, washed with acetone, and further washed with acetone using a Soxhlet extractor. Thereafter, the wood was air-dried and dried by hot blast of 105° C. to provide modified wood. The weight increase of phthalic anhydride and epichlorohydrin in the modified wood was 26.7% by weight based on the weight of the wood.

EXAMPLE 2

By applying the same treatment as in Example 1 to the dried wood as in Example 1 except that the wood was subjected to an impregnation treatment with a mixed solution composed of 7.0 g of phthalic anhydride and 80.9 g of allyl glycidyl ether (1:15 in the mol ratio of phthalic anhydride to allyl glycidyl ether) and the heating conditions were changed to 130° C. in the inside temperature and 2 hours in heating time, a modified wood was obtained. The weight increase of phthalic anhydride and allyl glycidyl ether in the modified wood was 23.5% by weight based on the weight of the wood.

EXAMPLE 3

By applying the same treatment as in Example 1 to the dried wood as in Example 1 except that the dried wood was subjected to an impregnation treatment with a mixed solution composed of 12.0 g of maleic anhydride and 169.8 g of epichlorohydrin (1:15 in the mol ratio of maleic anhydride to epichlorohydrin) and heating conditions were changed to 105° C. in inside temperature and 2 hours in heating time, a modified wood was obtained. The weight increase of maleic anhydride and epichlorohydrin in the modified wood was 25.2% by weight based on the weight of the wood.

EXAMPLE 4

By applying the same treatment as in Example 1 to the dried wood as in Example 1 except that the wood was subjected to an impregnation treatment with the mixed solution composed of 15.0 g of maleic anhydride and 141.5 g of epichlorohydrin (1:10 in the mol ratio of maleic anhydride to epichlorohydrin) and the heating conditions were changed to 120° C. in inside temperature and 2 hours in heating time, a modified wood was obtained. The weight increase of maleic anhydride and epichlorohydrin in the modified wood was 42.6% by weight based on the weight of the wood.

EXAMPLE 5

By applying the same treatment as in Example 1 to the dried wood as in Example 1 except that the wood was subjected to an impregnation treatment with a mixed solution composed of 20.0 g of maleic anhydride and 94.4 g of epichlorohydrin (1:5 in the mol ratio of maleic anhydride to epichlorohydrin) and the heating conditions were changed to 120° C. in inside temperature and 45 minutes in heating time, a modified wood was obtained. The weight increase of maleic anhydride and epichlorohydrin in the modified wood was 47.6% by weight based on the weight of the wood.

EXAMPLE 6

By applying the same treatment as in Example 1 to the dried wood as in Example 1 except that the wood was subjected to an impregnation treatment with a mixed solution of 80.0 g of maleic anhydride and 151.0 g of epichlorohydrin (1:2 in the mol ratio of maleic anhydride to epichlorohydrin) and the heating conditions were changed to 120° C. in inside temperature and 30 minutes in heating time, a modified wood was obtained. The weight increase of maleic anhydride and epichlorohydrin in the modified wood was 53.8% by weight based on the weight of the wood.

EXAMPLE 7

The dried wood as in Example 1 was dipped in a mixed solution composed of 15.0 g of maleic anhydride and 141.5 g of epichlorohydrin (1:10 in the mol ratio of maleic anhydride to epichlorohydrin) for 2 days. Then, the wood impregnated with the mixed solution was withdrawn from the mixed solution and then heated in reaction vessel to an inside temperature of 120° C. for 2 hours. After heating, the wood was treated as in Example 1 to provide a modified wood. The weight increase of maleic anhydride to epichlorohydrin in the modified wood was 35.3% by weight based on the weight of the wood.

Property Tests for Modified Woods

The modified woods obtained in Examples 1 to 7 and the untreated wood as a comparison sample were subjected to the following property tests.

The weight increases were shown by the total weight of the polybasic acid anhydride and the epoxy compound as % by weight based on the weight of the wood.

The hygroscopicity test was performed as follows. That is, after measuring the weight and the dimensions of each test piece absolutely dried in a hot blast dryer of 105° C., the test piece was placed in a desiccator (75% RH) of 23° C. containing a saturated aqueous solution of sodium chloride to cause moisture adsorption and then the moisture absorption ratio and the swelling ratio (tangential direction and radial direction) of the test piece were measured.

The drying-wetting repeating test was performed as follows. That is, after measuring the dimensions of each test piece absolutely dried by a hot blast dryer of 105° C., the test piece was immersed in distilled water in a vessel, and after reducing the inside pressure in the closed vessel for 30 minutes, the test piece was allowed to stand for 22 hours in distilled water in an open state. Thereafter, the test piece was withdrawn from water, the dimensions of the test piece in the water-absorbed state, and the antiswelling efficiency (AE) thereof was determined. Then, the test piece in the water-absorbed state was dried for 4 hours at 40° C. and then for 20 hours at 105° C., the dimensions of the test piece thus dried were measured, and the antishrink efficiency (ASE) thereof was determined.

A series of the operations was repeated 4 times and the antiswelling efficiency (AE) and the antishrinx efficiency (ASE) of the sample were determined in each time.

In addition, the antiswelling efficiency (AE) and the antishrink efficiency (ASE) are defined by the following equation:

$$AE \text{ (or } ASE) = \frac{Vc - Vt}{Vc} \times 100(\%)$$

wherein, $Vc$ represents a volume swelling (or shrinking) ratio of the untreated wood and $Vt$ represents a volume swelling (or shrinking) ratio of the treated wood.

The results of the hygroscopicity test and the drying-wetting repeating test are shown in Table 1 below.

TABLE 1

| | | | \multicolumn{7}{c}{Examples} | Comparison Example Untreated Wood |
|---|---|---|---|---|---|---|---|---|---|---|
| | | | 1 | 2 | 3 | 4 | 5 | 6 | 7 | |
| Weight Increase (%) | | | 26.7 | 25.5 | 25.2 | 42.6 | 47.6 | 53.8 | 35.3 | 0 |
| Acid Value (eq/kg) | | | 0.09 | 0.10 | 0.11 | 0.12 | 0.44 | 0.61 | 0.08 | 0.11 |
| Hygroscopic Test | Moisture-Absorption Ratio (%) | | 6.37 | 6.60 | 7.15 | 5.01 | 5.03 | 4.63 | 5.28 | 11.9 |
| | Swelling Ratio (%) | Tangential Direction | 1.41 | 1.42 | 1.58 | 1.24 | 1.31 | 1.07 | 0.98 | 2.88 |
| | | Radial Direction | 0.64 | 0.63 | 0.71 | 0.59 | 0.61 | 0.56 | 0.40 | 1.33 |
| Drying-Wetting Repeating Test | 1 | AE | 64.8 | 63.6 | 61.4 | 74.9 | 75.7 | 79.7 | 70.1 | — |
| | | ASE | 66.6 | 65.4 | 63.6 | 74.8 | 73.1 | 75.1 | 68.2 | — |
| | 2 | AE | 66.4 | 68.6 | 64.9 | 74.4 | 74.1 | 75.6 | 67.5 | — |
| | | ASE | 64.9 | 65.3 | 62.8 | 74.0 | 72.2 | 73.1 | 66.2 | — |
| | 3 | AE | 65.1 | 62.5 | 60.1 | 72.5 | 72.4 | 74.2 | 64.2 | — |
| | | ASE | 66.5 | 65.4 | 60.1 | 72.0 | 70.2 | 72.4 | 63.9 | — |
| | 4 | AE | 65.5 | 63.0 | 58.9 | 71.2 | 69.8 | 72.1 | 66.8 | — |
| | | ASE | 64.6 | 62.3 | 57.6 | 72.9 | 71.1 | 70.4 | 67.7 | — |

As is clear from the results shown in Table 1 above, it can be seen that the modified woods by the process of this invention in Examples 1 to 7 are very excellent in dimensional stability as compared to the untreated wood as the comparison sample, which shows the excellent effect of this invention.

EXAMPLE 8

The impregnation treatment for the dried wood as in Example 1 with the mixed solution and the heat treatment for the impregnated wood were performed as in Example 1. After the heat-treatment, the inside pressure in the reaction vessel was reduced to 5 mm Hg by suction while heating the reaction vessel to 110° C. to evaporate and recover the unreacted mixed solution remaining in the impregnated wood for one hour, and the modified wood was withdrawn from the reaction vessel. The weight increase of phthalic anhydride and epichlorohydrin in the modified wood was 35.9% by weight based on the weight of the wood. This case is defined as Example 8a.

Then, a part of the modified wood obtained above was washed with acetone using a Soxhlet extractor for extracting the free oligomer existing in the wood. Thereafter, the wood was air-dried and then dried by hot blast of 105° C. to provide a modified wood. The weight increase of phthalic anhydride and epichlorohydrin in the modified wood was 24.4% by weight based on the weight of the wood. This case is defined as Example 8b.

EXAMPLE 9

The impregnation treatment of the dried wood as in Example 1 with the mixed solution and the heat treatment for the impregnated wood were performed as in Example 2. After the heat-treatment, the inside pressure of the reaction vessel was reduced to 5 mm Hg by suction while heating the reaction vessel to 130° C. to evaporate and recover the unreacted mixed solution remaining in the treated wood for one hour, and the modified wood was withdrawn from the reaction vessel. The weight increase of phthalic anhydride and epichlorohydrin in the modified wood was 35.7% by weight based on the weight of the wood. This case is defined as Example 9a.

Then, a part of the modified wood obtained above was washed with acetone using a Soxhlet extractor for extracting the free oligomer existing in the wood. Thereafter, the wood was air-dried and then dried by hot blast of 105° C. to provide a modified wood. The weight increase of phthalic anhydride and allyl glycidyl ether in the modified wood was 25.4% by weight based on the weight of the wood. This case is defined as Example 9b.

EXAMPLE 10

The impregnation treatment of the dried wood as in Example 1 with the mixed solution and the heat treatment for the impregnated wood were performed as in Example 3. After the heat treatment, the inside pressure of the reaction vessel was reduced to 5 mm Hg by suction while heating the reaction vessel to 105° C. to evaporate and recover the unreacted mixed solution remaining in the treated wood for one hour, and the modified wood was withdrawn from the reaction vessel. The weight increase of maleic anhydride and epichlorohydrin in the modified wood was 36.6% by weight based on the weight of the wood. This case is defined as Example 10a.

Then, a part of the modified wood obtained above was washed with acetone using a Soxhlet extractor for extracting the free oligomer existing in the wood. Thereafter, the wood was air-dried and then dried by hot blast of 105° C. to provide a modified wood. The weight increase of maleic anhydride and epichlorohydrin in the modified wood was 24.8% by weight based on the weight of the wood. This case is defined as Example 10b.

EXAMPLE 11

The dried wood as in Example 1 was dipped in a mixed solution composed of 10.0 g of maleic anhydride and 139.7 g of allyl glycidyl ether (1:12 in the mol ratio of maleic anhydride to allyl glycidyl ether) and the mixed solution was injected in the wood for 30 minutes under reduced pressure to perform the impregnation treatment with the mixed solution. Then, the treated wood was withdrawn from the mixed solution and heated in a reaction vessel at an inside temperature of 110° C. for 2 hours. Thereafter, the inside pressure of the reaction vessel was reduced to 5 mm Hg while heating the reaction vessel to 110° C. to evaporate and recover the unreacted mixed solution remaining in the treated wood for one hour, and the modified wood was withdrawn from the reaction vessel. The weight increase of maleic anhydride and epichlorohydrin in the modified wood was 36.5% by weight based on the weight of the wood. This case is defined as Example 11a.

Then, a part of the modified wood obtained above was washed with acetone using a Soxhlet extractor for extracting the free oligomer existing in the wood. Thereafter, the wood was air-dried and then dried by hot blast of 105° C. to provide a modified wood. The weight increase of maleic anhydride and allyl glycidyl ether in the modified wood was 24.4% by weight based on the weight of the wood. This case is defined as Example 11b.

EXAMPLE 12

By following the same treatment as Example 11 except that a mixed solution composed of 10.0 g of succinic anhydride and 120.2 g of epichlorohydrin (1:13 in the mol ratio of succinic anhydride to epichlorohydrin) was used in place of the mixed solution in Example 11, a modified wood was obtained. The weight increase of succinic anhydride and epichlorohydrin in the modified wood was 35.3% by weight based on the weight of the wood.

Property Tests for Modified Woods

The modified woods obtained in Examples 8 to 12 and the untreated wood as a comparison sample were subjected to the following property tests.

The drying-wetting repeating test was performed as follows. That is, after measuring the dimensions of each test piece absolutely dried by a hot blast dryer of 105° C., the test piece was immersed in warm water of 40° C. for 6 hours. Thereafter, the test piece was withdrawn therefrom, the dimensions of the test piece in the water-absorbed state were measured, and then the antiswelling efficiency (AE') was determined. Then, the antishrink efficiency (ASE') thereof was also determined by the same manner as determining the antishrink efficiency (ASE) described hereinbefore. A series of these operations was repeated thrice and the antiswelling efficiency (AE', %) and the antishrink efficiency (ASE', %) of each sample were determined in each time.

The weather resistance test was performed by exposing each sample for 1,000 hours using a sun shine weather meter of 3 months in a outdoor exposure test and then observing the surface state of each sample piece.

The results of the hygroscopic test and the drying-wetting repeating test are shown in Table 2 below and the results of the weather resistance test are shown in Table 3 below.

TABLE 2

|  |  |  | Examples | | | | | | | Comparison Example Untreated Wood |
|---|---|---|---|---|---|---|---|---|---|---|
|  |  |  | 8a | 8b | 10a | 10b | 11a | 11b | 12 |  |
| Weight Increase (%) |  |  | 35.9 | 24.4 | 36.6 | 24.8 | 36.5 | 24.4 | 35.3 | 0 |
| Acid Value (eq/kg) |  |  | 0.10 | 0.14 | 0.16 | 0.12 | 0.09 | 0.09 | 0.36 | 0.11 |
| Hygroscopic Test | Moisture-Absorption Ratio (%) |  | 5.73 | 6.45 | 5.92 | 7.21 | 6.14 | 7.30 | 6.32 | 11.9 |
|  | Swelling Ratio (%) | Tangential Direction | 1.27 | 1.43 | 1.33 | 1.60 | 1.26 | 1.66 | 1.40 | 2.88 |
|  |  | Radial Direction | 0.54 | 0.66 | 0.53 | 0.73 | 0.47 | 0.69 | 0.57 | 1.33 |
| Drying-Wetting Repeating Test | 1 | AE' | 70.2 | 64.9 | 75.7 | 59.8 | 69.6 | 55.1 | 77.1 | — |
|  |  | ASE' | 72.1 | 65.0 | 65.2 | 61.8 | 62.5 | 56.3 | 67.4 | — |
|  | 2 | AE' | 71.4 | 65.7 | 68.9 | 62.8 | 62.4 | 56.0 | 68.3 | — |
|  |  | ASE' | 71.0 | 66.4 | 63.7 | 62.6 | 60.7 | 55.0 | 66.5 | — |
|  | 3 | AE' | 71.7 | 67.0 | 64.7 | 63.0 | 61.7 | 55.8 | 68.5 | — |
|  |  | ASE' | 70.6 | 66.2 | 62.8 | 62.6 | 59.9 | 54.9 | 66.5 | — |

TABLE 3

|  | Examples | | | | | | | Comparison Example Untreated Wood |
|---|---|---|---|---|---|---|---|---|
|  | 8a | 8b | 9a | 9b | 10b | 11b | 12 |  |
| Sun Shine Weather Meter Test (1000 hrs) | Good (Ocher Color) | Good (Ocher Color) | Good (Ocher Color) | Good (Ocher Color) | Good (Ocher Color) | Good (Ocher Color) | Good (Ocher Color) | Deteriorated (Red Brown) |
| Outdoor Exposure Test (3 months) | Good (Ocher Color) | Good (Ocher Color) | Good (Ocher Color) | Good (Ocher Color) | Good (Ocher Color) | Good (Ocher Color) | Good (Ocher Color) | Deteriorated (Red Brown) |

(the untreated wood before test: white-yellow color)

As is clear from the results shown in Table 2 and Table 3, it can be seen that the modified woods by the process of this invention in Examples 8 to 12 are very excellent in dimensional stability and weather resistance as compared to the untreated wood as the comparison sample. Also, as is clear from the results shown in Table 2, it can be further seen that the modified woods containing therein the free oligomer of the polybasic acid anhydride and the epoxy compound formed as a side reaction product during heating in the process of this invention are very excellent in dimensional stability as compared with the modified wood from which the free oligomer was removed by the acetone extraction, which clearly shows the excellent effect of this invention.

In addition, the impregnation treatment process in this invention is excellent as compared to the conventional heating-in-solution process in the points that the mixed solution can be stably used for a long period of time and coloring is scarcely observed. Also, the process of this invention has a feature that a large heat energy and a long period of time are not required for increasing the temperature of the mixed solution.

What is claimed is:

1. A process of producing modified wood, which comprises impregnating wood with a mixed solution consisting of a polybasic acid anhydride and a monoepoxide compound to provide a mixed solution-impregnated wood, separating the mixed solution-impregnated wood from any excess mixed solution which remains unimpregnated and then heating the mixed solution-impregnated wood to a temperature of from 60° C. to 180° C., whereby the mixed solution-impregnated wood is chemically modified by simultaneously adding the polybasic acid anhydride and the epoxy compound to the hydroxy groups of the wood existing at least in a surface layer of the wood.

2. A process of producing modified wood, which comprises impregnating wood with a mixed solution comprising a polybasic acid anhydride and a monoepoxide compound to form a mixed solution-impregnated wood, separating the mixed solution-impregnated wood from any excess mixed solution which remains unimpregnated, heating the mixed solution-impregnated wood to a temperature of from 60° C. to 180° C. to chemically modify the wood, and during or after the chemical modification, subjecting the mixed solution-impregnated wood to reduced pressure, whereby any unreacted mixed solution is evaporated from the wood and recovered, whereby a free oligomer of the polybasic acid anhydride and the monoepoxide compound formed as a reaction product during the heating is left in the modified wood.

3. The process of producing modified wood as claimed in claim 1, wherein the water content of the wood subjected to said impregnation is less than 10%.

4. The process of producing modified wood as claimed in claim 1, wherein the mol ratio of the polybasic acid anhydride to the monoepoxide compound in the mixed solution comprising both the components is 1:1 to 1:30.

5. The process of producing modified wood as claimed in claim 1, wherein the polybasic acid anhydride is phthalic anhydride, maleic anhydride, or succinic anhydride.

6. The process of producing modified wood as claimed in claim 1, wherein the polybasic acid anhydride is phthalic anhydride.

7. The process of producing modified wood as claimed in claim 1, wherein the monoepoxide compound is epichlorohydrin, methyl glycidyl ether, ethyl glycidyl ether, allyl glycidyl ether, glycidyl methacrylate, or styrene oxide.

8. The process of producing modified wood as claimed in claim 1, wherein the monoepoxide compound is epichlorohydrin.

9. The process of producing modified wood as claimed in claim 1, wherein the wood is impregnated with a mixed solution under reduced pressure, under increased pressure, or under alternating steps under reduced pressure and increased pressure.

10. The process as claimed in claim 1, wherein the mixed solution-impregnated wood is heated to a temperature of from 60° C. to 180° C. to perform chemical modification and during or after the chemical modification, the mixed-solution impregnated wood is subjected to a reduced pressure of less than 50 mm Hg to remove any unreacted polybasic acid anhydride and monoepoxide compound.

11. The process of producing modified wood as claimed in claim 2, wherein the water content of the wood subjected to impregnation is less than 10%.

12. The process of producing modified wood as claimed in claim 2, wherein the mol ratio of the polybasic acid anhydride to the monoepoxide compound in the mixed solution comprising both the components is 1:1 to 1:30.

13. The process of producing modified wood as claimed in claim 2, wherein the polybasic anhydride is phthallic anhydride, maleic anhydride, or succinic anhydride.

14. The process of producing modified wood as claimed in claim 2, wherein the polybasic acid anhydride is phthalic anhydride.

15. The process of producing modified wood as claimed in claim 2, wherein the monoepoxide compound is epichlorohydrin, methyl glycidyl ether, ethyl glycidyl ether, allyl glycidyl ether, glycidyl methacrylate, or styrene oxide.

16. The process of producing modified wood as claimed in claim 2, wherein the monoepoxide compound is epichlorohydrin.

17. The process of producing modified wood as claimed in claim 2, wherein the wood is impregnated with the mixed solution under reduced pressure, under increased pressure, or under alternating steps under reduced pressure and increased pressure.

18. The process as claimed in claim 2, wherein the mixed solution-impregnated wood is heated to a temperature of from 60° C. to 180° C. to perform said chemical modification and during or after the chemical modification, the mixed solution-impregnated wood is subjected to a reduced pressure of less than 50 mm Hg to remove any unreacted polybasic acid anhydride and monoepoxide compound.

* * * * *